United States Patent
Rothschild et al.

(10) Patent No.: US 8,739,215 B2
(45) Date of Patent: May 27, 2014

(54) SYSTEMS, METHODS, AND APPARATUS FOR ASSOCIATING APPLICATIONS WITH AN ELECTRONIC PROGRAM GUIDE

(75) Inventors: Keith Alan Rothschild, Dunwoody, GA (US); Julius Bert Bagley, Lawrenceville, GA (US); Robert Lee Ames, Jr., Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 188 days.

(21) Appl. No.: 12/840,850

(22) Filed: Jul. 21, 2010

(65) Prior Publication Data

US 2012/0023525 A1 Jan. 26, 2012

(51) Int. Cl.
*H04N 5/445* (2011.01)
*G06F 3/00* (2006.01)

(52) U.S. Cl.
USPC ............................................. 725/43; 725/55

(58) Field of Classification Search
None
See application file for complete search history.

(56) References Cited

U.S. PATENT DOCUMENTS

| | | | |
|---|---|---|---|
| 7,073,189 B2 * | 7/2006 | McElhatten et al. ............ | 725/58 |
| 7,225,455 B2 | 5/2007 | Bennington et al. | |
| 7,493,641 B2 | 2/2009 | Klosterman et al. | |
| 7,634,789 B2 * | 12/2009 | Gerba et al. .................... | 725/44 |
| 7,665,109 B2 | 2/2010 | Matthews, III et al. | |
| 2003/0177495 A1 * | 9/2003 | Needham et al. ............... | 725/55 |
| 2003/0229900 A1 * | 12/2003 | Reisman .......................... | 725/87 |
| 2004/0006768 A1 * | 1/2004 | Deshpande et al. ............ | 725/44 |
| 2004/0078814 A1 * | 4/2004 | Allen ............................... | 725/47 |
| 2005/0050576 A1 * | 3/2005 | Upendran et al. ............. | 725/110 |
| 2005/0283800 A1 * | 12/2005 | Ellis et al. ....................... | 725/40 |
| 2006/0271973 A1 * | 11/2006 | Jerding et al. .................. | 725/86 |
| 2007/0061724 A1 | 3/2007 | Slothouber et al. | |
| 2008/0088735 A1 * | 4/2008 | Biniak et al. .................. | 348/468 |
| 2009/0150941 A1 | 6/2009 | Riedl et al. | |
| 2009/0217320 A1 * | 8/2009 | Aldrey ............................ | 725/37 |
| 2009/0217329 A1 | 8/2009 | Riedl et al. | |
| 2010/0229197 A1 * | 9/2010 | Yi et al. .......................... | 725/40 |
| 2010/0313231 A1 * | 12/2010 | Okamoto et al. ............. | 725/110 |

\* cited by examiner

*Primary Examiner* — Brian T Pendleton
*Assistant Examiner* — Ryan Stronczer
(74) *Attorney, Agent, or Firm* — Sutherland Asbill & Brennan LLP

(57) ABSTRACT

Systems and methods for associating applications with an electronic program guide are provided. An electronic program guide that includes television schedule information organized in a grid by time and channel may be generated. The electronic program guide may be configured for presentation to a user by an electronic program guide application executed by a programming processing component associated with the user. A second application different from the electronic program guide application may be associated with an entry in the grid of the electronic program guide. The second application may be configured for execution by the programming processing component based at least in part upon the user selecting the entry. Once generated, the electronic program guide may be output for receipt by the programming processing component.

21 Claims, 6 Drawing Sheets

| | Electronic Program Guide Data | | | |
|---|---|---|---|---|
| | 8:00 p.m. | 8:30 p.m. | 9:00 p.m. | 9:30 p.m. |
| 2 | TV Show | TV Show | TV Show | |
| 3 | Movie | | | |
| 4 | TV Show | TV Show | Movie | |
| 5 | Movie | | | |
| 6 | TV Show | TV Show | TV Show | TV Show |
| 7 | Movie | | TV Show | TV Show |

FIG. 2

SYSTEMS, METHODS, AND APPARATUS FOR ASSOCIATING APPLICATIONS WITH AN ELECTRONIC PROGRAM GUIDE

FIELD OF THE INVENTION

Aspects of the invention relate generally to electronic program guides, and more particularly, to electronic program guides that facilitate access to additional applications that are associated with the electronic program guides.

BACKGROUND OF THE INVENTION

A wide variety of service providers, such as cable providers and satellite providers, provide entertainment services to customers, including television services, on demand programming services, and other entertainment and/or informational services. In many situations, a service provider provides an interactive electronic program guide ("EPG") in conjunction with provided services. The EPG typically includes a listing of programs that are broadcast or output by the service provider for reception by customers. The listing is often organized by channel and by time slots. Additionally, the EPG may include information for various programming options that may be purchased by a customer, such as movies, premium television shows, other pay-per-view events, etc. The EPG may be received by a customer device, such as a set top box, and displayed to the customer using an electronic program guide application.

The functionality that is provided by a conventional EPG application is typically limited. For example, a customer may be able to navigate through available content and, in some cases, obtain additional alphanumeric information about a listing, such as a text-based description of a television program. However, the conventional EPG applications often do not include a wide variety of other functionality desired by many consumers, such as the ability to conveniently purchase a pay-per-view program, the ability to rate a television program, etc. Accordingly, systems, methods, and/or apparatus that facilitate an extension of the functionality of an EPG are desirable. More specifically, systems, methods, and apparatus that facilitate the association of additional applications with an EPG application are desirable.

BRIEF DESCRIPTION OF THE INVENTION

Some or all of the above needs and/or problems may be addressed by certain embodiments of the invention. Embodiments of the invention may include systems, methods, and apparatus for associating applications with an electronic program guide. In one embodiment, a method for associating one or more applications with an electronic program guide may be provided. An electronic program guide that includes television schedule information organized in a grid by time and channel may be generated. The electronic program guide may be configured for presentation to a user by an electronic program guide application executed by a programming processing component associated with the user. A second application different from the electronic program guide application may be associated with an entry in the grid of the electronic program guide. The second application may be configured for execution by the programming processing component based at least in part upon the user selecting the entry. Once generated, the electronic program guide may be output for receipt by the programming processing component.

In accordance with another embodiment of the invention, a data server for associating one or more applications with an electronic program guide may be provided. The data server may include at least one communications interface and at least one processor. The at least one communications interface may be configured to communicate an electronic program guide to a programming processing component associated with a user, where the electronic program guide is presented to the user by an electronic program guide application executed by the programming processing component. The at least one processor may be configured to (i) generate the electronic program guide, the guide comprising television schedule information organized in a grid by time and channel, (ii) associate, with an entry in the grid, a second application different from the electronic program guide application, wherein the second application is executed by the programming processing component based at least in part upon the user selecting the entry, and (iii) direct the at least one communications interface to communicate the electronic program guide to the programming processing component.

In accordance with another embodiment of the invention, a programming processing component that is configured to access one or more applications via an electronic program guide application may be provided. The programming processing component may include at least one communications interface, at least one user interface, and at least one processor. The at least one communications interface may be configured to receive a broadband signal comprising electronic program guide data, the electronic program guide data comprising television schedule information that is organized in a grid by time and channel for presentation to a user. The at least one user interface may be configured to receive user input associated with a displayed grid associated with the electronic program guide data. The at least one processor may be configured to execute an electronic program guide application that (i) formats the grid for display to the user, wherein an entry of the grid is associated with a second application different from the electronic program guide application, (ii) outputs the grid for display to the user, and (iii) receives a user selection of the entry of the grid. The at least one processor may further be configured to execute the second application based upon the received user selection.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein:

FIG. 2 illustrates one example display that may be presented by an electronic program guide application, according to an example embodiment of the invention.

DETAILED DESCRIPTION

Figure 1:
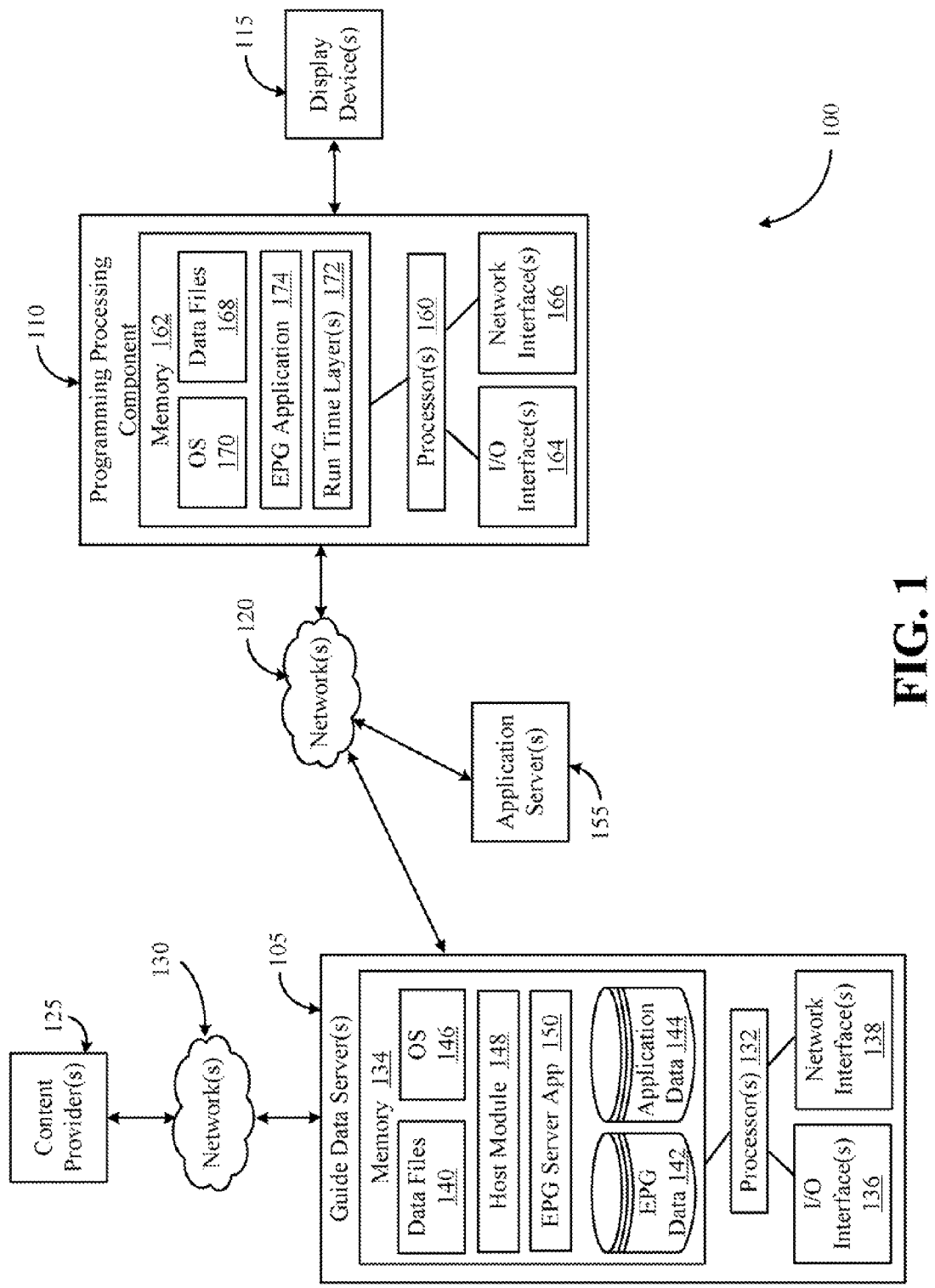
FIG. 1 illustrates a block diagram of an example system that may be utilized to associate applications with an electronic program guide, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and apparatus for associating applications with an electronic program guide ("EPG"). In certain embodiments, a data server, such as a guide data server and/or a content server associated with a service provider (e.g., a cable provider, satellite service provider, etc.), generates EPG data that is configured to be communicated to one or more programming processing components (e.g., set top boxes) associated with customers of the service providers. The EPG data may include television schedule information, pay-per-view information, and/or other programming content information that is organized in a grid by time and channel. Additionally, the EPG data may be formatted such that an EPG application executed by the programming processing components may direct the display of the EPG to a customer via a suitable display device, such as a television.

According to an aspect of the invention, the data server may further be configured to associate one or more applications with the EPG data that is communicated to the programming processing components. In certain embodiments, an additional application may be incorporated into the EPG data. In other embodiments, a pointer or link to an additional application may be incorporated into the EPG data. In this regard, the additional application may be accessed from a wide variety of locations as desired in various embodiments, such as a memory associated with the data server, a local memory associated with a programming processing component, and/or a carousel data stream that is accessible by the programming processing component. Whether application data or a link to an application is incorporated into the EPG data, the data associated with an additional application may be associated with an entry in the grid of the electronic program guide. When a customer is navigating through the EPG grid, the additional application may be launched based upon a user selection of the grid entry. The additional application may then be executed by the customer's programming processing component. In certain embodiments, the execution of the EPG application may be suspended when the additional application is executed. In other embodiments, the additional application may be executed in parallel with the EPG application.

Additionally, a wide variety of different types of additional applications may be associated with EPG data as desired in various embodiments of the invention. For example, in certain embodiments, an additional application may be an Enhanced TV Binary Interchange Format ("EBIF") application. In other embodiments, an additional application may be a Java application. As desired, other types of applications may be associated with EPG data, such as AppleScript applications, Virtual Basic for Applications ("VBA") applications, Common. List Object System ("CLOS") applications, Eiffel applications, Sather applications, Perl applications, Obliq applications, and/or other applications that are generated utilizing other suitable programming languages, protocols, and/or techniques.

System Overview

An example system 100 for associating applications with an EPG will now be described illustratively with respect to FIG. 1. The system 100 may include one or more guide data servers 105 that are associated with a service provider, such as a cable service provider or a satellite television service provider, and configured to generate EPG data that is provided to one or more programming processing components 110 associated with customers of the service provider. The EPG data may be communicated to a programming processing component via any number of suitable networks 120, such as a cable network or a satellite network. The EPG data may then be presented to customers via any number of display devices 115 associated with the customers.

With reference to FIG. 1, a guide data server 105 may be associated with an underlying service provider, such as a cable service provider, satellite service provider, or other service provider. A guide data server 105 may receive guide data, programming information, and/or content information from any number of content providers 125, such as television content providers, pay-per-view content providers, on demand content providers, etc., via any number of suitable networks 120. The guide data server 105 may utilize at least a portion of the received information to generate or construct EPG data that may be output for communication to any number of programming processing components. Additionally, in accordance with an aspect of the invention, the guide data server 105 may associate one or more additional programs with the EPG data.

A guide data server 105 may include any number of suitable processor-driven devices that facilitate the generation of EPG data and/or the association of one or more additional applications with the EPG data. As such, the guide data server 105 may include any number of computing devices, such as a server computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the guide data server 105 may form a special purpose computer or other particular machine that is operable to facilitate the generation of EPG data and/or the association of one or more additional applications with the EPG data. Although a single guide data server 105 is described below, the operations and/or control of the guide data server 105 may be distributed among any number of devices, computers, and/or processing components.

In addition to having one or more processors 132, the guide data server 105 may include one or more memory devices 134, input/output ("I/O") interfaces 136, and/or network interfaces 138. The memory devices 134 may include any number of suitable memory devices, such as caches, read-only memory devices, random access memory devices, magnetic storage devices, etc. The memory devices 134 may store data, executable instructions, and/or various program modules utilized by the processor(s) 132. Examples of data that may be stored by the memory devices 134 include data files 140 and/or any number of databases or data repositories, such as an EPG database 142 and/or an application database 144. The data files 140 may include any suitable data that facilitates the operation of the guide data server 105, the collection of content data from content providers 125, the generation of EPG data, and/or the association of applications with EPG data. For example, the data files 140 may include, but are not limited to, information that facilitates communication with the content providers, template data and/or formatting data associated with generating EPG data and/or broadcast streams of EPG data, and/or data associated with customer and/or groups of customers of the service provider. The EPG database 142 may include, for example, guide and program data received from the content providers and EPG data formatted and/or generated by the guide data server 105, such as information that may be utilized to populate an EPG grid. The application database 144 may include a wide variety of information associated with one or more additional applications that may be associated with EPG data, such as executable data and/or instructions for applications and/or components of applications, location information associated with memory locations and/or servers at which applications are stored, identifying information associated with applications, input/output parameter information associated with applications, execution parameters associated with applications (e.g., customer input parameters that will trigger an application), and/or various conditions and/or parameters that facilitate the association of applications with EPG data (e.g., identifiers of program types that an application can be associated with, indicators and/or icons to be displayed in an EPG grid, etc.).

In addition to storing data, the memory devices 134 may store any number of program modules that may be executed by the processor(s), such as an operating system ("OS") 146, a host module 148, and/or an EPG server application 150. The OS 146 may be a suitable software module that controls the general operation of the guide data server 105. The OS 146 may also facilitate the execution of other software modules, for example, the host module 148 and/or the EPG server application 150. The host module 148 may be a suitable software module that facilitates communications with the one or more content providers 125 in order to obtain guide data and/or programming data from the content providers 125. As desired in certain embodiments, the host module 148 may initiate communication with one or more content providers 125 in order to pull data from the one or more content providers 125. For example, the host module 148 may communicate a request for guide data to a content provider 125, and the content provider 125 may communicate guide data to the host module 148 in response to the request. In other embodiments, one or more content providers 125 may push guide data to the guide data server 105 without the host module 148 submitting a request for guide data.

Communications between the content providers 125 and the guide data server 105 may be facilitated via any number of suitable networks 130. The networks 130 may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless. Additionally, although the receipt of data from content providers 125 is described as involving network communications, other techniques may be utilized to receive guide and/or content data from content providers 125. For example, content data may be received via any number of physical memory devices (e.g., CD-ROMs, floppy disks, portable memory devices, etc.), and the content data may be provided to the guide data server 105 via one or more suitable I/O interface devices, such as a Universal Serial Bus ("USB") port, disk drive, etc. As another example, hard copy content data may be received by a service provider associated with the guide data server 105, and at least a portion of the data may be manually entered for processing by the guide data server 105.

In certain embodiments, the host module 148 may facilitate the output of the EPG data for ultimate receipt by one or more programming processing components 110. For example, the host module 148 may incorporate generated EPG data into one or more broadband signals (e.g., a cable television signal, a satellite data stream, etc.) that is output for downstream transmission to one or more programming processing components 110. As another example, the host module 148 may communicate generated EPG data to another component and/or system associated with the service provider for incorporation into one or more broadband data signals.

The EPG server application 150 may be a suitable software module that facilitates the collection and/or generation of EPG data, as well as the association of one or more additional applications with the EPG data. In one example embodiment, the EPG server application 150 may obtain collected guide data and/or content data from one or more content providers 125, and the EPG server application 150 may generate a data file and/or data stream that includes EPG data that can be mapped to an EPG grid by a programming processing component 110. The EPG data may include scheduling information for any number of channels and time slots that may be viewed by customers of the service provider. Additionally, the EPG data may include data associated with scheduled television shows, movies, pay-per-view features, and/or other types of content that may be mapped to an EPG grid. According to an aspect of the invention, the formatted and/or generated EPG data may include on-time, on-channel guide data. A wide variety of information may be included in the EPG data as desired in various embodiments, such as descriptive information for one or more shows, timing information for one or more shows, etc. Once generated, the EPG data may be output for receipt by one or more programming processing components 110. For example, the EPG data may be incorporated into a broadband signal that is received by programming processing components 110. An EPG application associated with a programming processing component 110 may receive the EPG data and map it to an interactive grid that is displayed to a customer.

According to an aspect of the invention, the EPG server application 150 may additionally be configured to associate one or more additional applications with EPG data. In this regard, a customer selection of an entry in a displayed EPG grid may result in an additional application being executed by the programming processing component 110. A wide variety of suitable techniques may be utilized as desired to associate an application with EPG data. For example, an entire application may be incorporated into EPG data and associated with a grid entry included in the EPG data. As another example, a pointer or link to an application may be incorporated into EPG data and associated with a grid entry. In this regard, when the grid entry is selected by a customer, the pointer or link may be utilized to access the additional application from a data source, such as the guide data server 105, a separate application server 155 on which the application is stored, a carousel or looping data stream that is accessible by the programming processing component 110 (e.g., a carousel data stream that is included in a broadband data signal provided to the programming processing component 110), a local memory that is associated with or incorporated into the programming processing component 110, or any other suitable data source. In certain embodiments, the pointer or link may be a pointer to a memory location at which the application is stored. In other embodiments, the pointer or link may include a Universal Resource Locator ("URL") that is utilized to access a server that hosts the application.

A wide variety of different types of applications may be associated with EPG data as desired in various embodiments. One example application is a pay-per-view ("PPV") application that facilitates the purchase of a PPV event. For example, when a customer selects an EPG grid entry associated with a PPV event, the PPV application may be executed or launched. The PPV application may then manage a purchase of the PPV event by the subscriber. In certain embodiments, the PPV application may facilitate direct interaction with a service provider head end server to manage the purchase of the PPV event. Another example application is an application that allows a customer to obtain additional information about a product or service that is associated with a television show. For example, when a customer selects an EPG grid entry associated with an infomercial or shopping network broadcast, an application may be executed that provides additional information for one or more products or services and/or that facilitates a purchase of one or more products or services. As one example, an application may connect to a data server, such as a Web data server associated with the sponsor of the television show, and the customer may interact with the Web data server to obtain additional product information and/or to purchase a product. Although an example application is described as an application that allows a customer to obtain additional information associated with offered products and/or services, other example applications may similarly provide a customer with other types of additional information associated with television shows. For example, an application associated with a historical television show may connect to a Web server that provides additional information about a historical event.

Yet another example application is an application that facilitates customer rating and/or voting associated with a television show. For example, a customer selection of an EPG grid entry associated with a television competition show (e.g., a dancing competition show, a talent show, etc.) may launch an application that facilitates user voting. Another example application is an application that facilitates digital video recording of an associated television show, such as recording by the programming processing component or recording by a remote programming processing component (e.g., a remote set top box). For example, a customer selection of an EPG grid associated with a television show may launch an application that permits a user to schedule recording of the television show by a separate device associated with the customer's account with the service provider. The example applications described above are not intended to be limiting. Indeed, any number of suitable applications may be utilized in accordance with various embodiments of the invention.

Additionally, applications that are associated with EPG data may be programmed utilizing any number of suitable programming techniques and/or programming languages. For example, an associated application may be an Enhanced Television Binary Interchange Format ("EBIF") application or applet, a Java application or applet, an AppleScript application, a Virtual Basic for Applications ("VBA") application, a Common List Object System ("CLOS") application, an Eiffel application, a Sather application, a Perl application, an Obliq application, and/or an application that utilizes another suitable programming language or protocol that can be interpreted by a programming processing component 110.

The one or more I/O interfaces 136 may facilitate communication between the guide data server 105 and one or more input/output devices, for example, one or more user interface devices, such as a display, keypad, mouse, pointing device, control panel, touch screen display, remote control, microphone, speaker, etc., that facilitate user interaction with the guide data server 105. In this regard, user commands may be received by the guide data server 105.

The one or more network interfaces 138 may facilitate connection of the guide data server 105 to one or more suitable networks, for example, the networks 120 and 130 illustrated in FIG. 1. In this regard, the guide data server 105 may receive and/or communicate information to other components of the system 100, such as the content providers 125 and/or the programming processing components 110. In certain embodiments, the network interfaces 138 may include one or more broadband signal interfaces configured to connect to a broadband network 120, such as a cable network, satellite network, etc., and output data onto the broadband network 120 for receipt by any number of programming processing components 110. For example, EPG guide data may be incorporated into a broadband data signal and output onto a cable infrastructure for receipt by customers of a cable service provider.

With continued reference to FIG. 1, the programming processing component 110 may be any suitable device and/or software application that is capable of receiving and processing a broadband signal (e.g., a cable signal, satellite signal, etc.) that is output by a service provider. Examples of suitable programming processing components 110 include, but are not limited to, a set top box ("STB") (e.g., a cable STB, a digital satellite STB, an Internet Protocol Television STB, etc.), a virtual STB, an embedded STB, etc. In certain embodiments, the programming processing component 110 may be connected to a display device 115 associated with a customer. In other embodiments, the programming processing component 110 may be embedded, incorporated into, and/or executed on the display device 115. In operation, the programming processing component 110 may receive at least a portion of a broadband data signal that is output by a service provider and convert at least a portion of the received signal into content which is displayed or otherwise output by the display device 115. As desired, the programming processing component 110 may receive a broadband data signal via any number of suitable networks 120, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the source of a broadband signal and the programming processing component 110.

As desired, a broadband signal that is provided to the programming processing component 110 may include a wide variety of data components, including but not limited to, a television signal, a digital television signal, data associated with a Voice over Internet Protocol ("VoIP") telephone service, data associated with Internet service, data associated with home monitoring services, etc. The programming processing component 110 may receive and process the broadband signal. As desired, the programming processing component 110 may selectively output a portion of the broadband signal, such as digital television data (e.g., audio and/or video data) and/or EPG data, to the display device 115 for presentation to a customer. As desired, any number of suitable connections and/or connecting devices, such as coaxial cables, High-Definition Multimedia Interface ("HDMI") cables, etc., may be utilized to connect the programming processing component 110 to a display device 115. Additionally, in certain embodiments, the programming processing component 110 may output audio data to any number of audio components, such as a home theater system, stereo system, etc. In this regard, the audio data may be output by one or more speakers. In other embodiments, the programming processing component 110 may output audio data directly to one or more speakers. In yet other embodiments, the audio data output by the programming processing component 110 for receipt by a television may be passed on to a home theater system and/or one or more speakers.

In one example embodiment, a programming processing component 110 may include any number of suitable processor-driven devices that facilitate the receipt, processing, and/or output of a broadband signal and/or EPG data. As such, the programming processing component 110 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions by the programming processing component 110 may form a special purpose computer or other particular machine that is operable to facilitate the processing and/or output of a broadband signal and/or EPG data.

In addition to having one or more processors 160, the programming processing component 110 may include one or more memory devices 162, input/output ("I/O") interfaces 164, and/or network interfaces 166. The memory devices 162 may include any number of suitable memory devices, such as caches, read-only memory devices, random access memory devices, magnetic storage devices, etc. The memory devices 162 may store data, executable instructions, and/or various program modules utilized by the processor(s) 160, for example, data files 168, an operating system ("OS") 170, any number of run-time layers or run-time applications 172, and/or an EPG application 174. The data files 168 may include any suitable data that facilitates the provision of broadband services to a customer, the processing of a broadband signal, and/or the output of various components of a broadband signal. For example, the data files 168 may include, but are not limited to, customer profile information, information associated with one or more display devices 115, information associated with generating an EPG grid utilizing received EPG data, information associated with processing customer input and commands (e.g., remote control input), information associated with formatting components of a broadband signal for display, etc.

The OS 170 may be a suitable software module that controls the general operation of the guide data server 105. The OS 170 may also facilitate the execution of other software modules, for example, the EPG application 174. The run-time layer(s) 172 may include a collection of software that is designed to support the execution of programs and/or applications that are written in a wide variety of computer languages. In doing so, the run-time layer(s) 172 may provide and/or access a wide variety of subroutines and libraries for information associated with common operations, programming language commands, and/or other data that facilitates the execution of various software applications. In this regard, the run-time layer(s) 172 and/or the OS 170 may facilitate the execution of any number of additional applications that are associated with EPG data.

The EPG application 174 may be a suitable software module that is configured to identify, process, and format EPG data that is received by the programming processing component 110, for example, EPG data that is included in a received broadband signal. The EPG application 174 may format received EPG data for presentation to a customer via an EPG grid. For example, received EPG data may be parsed and organized by channel and time slot. The organized data may then be formatted for display in an EPG grid. When a customer command or request for EPG data, such as a selection of a remote control button or option associated with requesting guide data, is received, the EPG application 174 may direct the output of the EPG grid for presentation to the customer via the display device 115. One example of an EPG grid that may be presented to a customer is described in greater detail below with reference to FIG. 2.

Once presented, a customer may navigate through the displayed EPG grid. The customer may select an individual entry that is included in the grid. Based upon the selection of a grid entry, a determination may be made by the EPG application 174 and/or another application associated with the programming processing component 110 as to whether an additional application or a pointer to an additional application is associated with the grid entry. If an additional application is associated with the grid entry, then the additional application may be executed by the run-time layer 172 and/or the OS 170 of the programming processing component 110. In certain embodiments, the executable application may be embedded in the EPG data, and executable instructions associated with the additional application may be obtained from the EPG data and utilized to execute the additional applications. In other embodiments, a pointer to the executable application may be utilized to obtain executable instructions associated with the additional application from any number of suitable data sources. For example, a pointer may be utilized to access local memory associated with the programming processing component 110 in order to obtain the additional application. As another example, a pointer or link (e.g., a memory location pointer, URL, etc.) may be utilized to access an additional application that is stored on the guide data server 105 and/or an application server 155. As yet another example, a pointer may be utilized to identify an additional application that is included in a carousel file or carousel signal that is provided by the guide data server 105 in a continuously looping manner.

In certain embodiments of the invention, an additional application may be automatically executed when a customer or user selects an entry in a presented EPG grid. For example, if a customer navigates to a grid entry and selects an enter or select button utilizing a remote control or other input device, then the additional application may automatically be executed. As one example, if the customer selects an entry associated with a PPV event, then an additional application that manages a purchase of the PPV event and/or that provides additional information associated with the PPV event may be launched or executed. In other embodiments, one or more intermediate screens and/or displays may be presented to a customer prior to execution of the additional application. For example, if the customer selects an entry associated with a PPV event, then an additional display providing additional information associated with the PPV event may be presented to the customer by the EPG application 174. The additional display may include any number of selectable indicators, such as an indicator that permits the customer to return to the EPG display and/or an indicator that facilitates a purchase of the PPV event. The additional application that manages a PPV purchase may be launched or executed based upon a customer selection of the purchase indicator that is presented via the intermediate display. As another example, selection of a grid entry associated with a television program may result in the presentation of a display that provides additional information for the television program, such as a detailed description of the television program. The additional display may include any number of selectable indicators that are associated with corresponding additional applications, such as a selectable rating indicator that launches an application that permits a customer to rate the television program, a selectable voting indicator that launches an application that permits a customer to submit votes in association with the program, and/or any number of selectable links that launch applications that provide more information to the customer.

As set forth above, a wide variety of additional applications may be associated with an EPG as desired in various embodiments of the invention. Additionally, in certain embodiments of the invention, the additional application may be executed in parallel with the EPG application 174. In other embodiments, the execution of the EPG application 174 may be suspended when an additional application is executed.

With continued reference to the programming processing component 110, the one or more I/O interfaces 164 may facilitate communication between the programming processing component 110 and one or more input/output devices, for example, one or more user interface devices, such as a television, monitor, remote control, microphone, speaker, etc., that facilitate user interaction with the programming processing component 110. In this regard, information may be output for presentation or display, and one or more user commands may be received by the programming processing component 110.

The one or more network interfaces 166 may facilitate connection of the programming processing component 110 to one or more suitable networks, for example, the networks 120 illustrated in FIG. 1. In this regard, the programming processing component 110 may be configured to connect to a broadband network 120, such as a cable network, satellite network, etc., and receive data that is output by the guide data server 105 and/or a head end server associated with a service provider.

With continued reference to FIG. 1, any number of application servers 155 may be provided as desired in various embodiments of the invention. An application server 155 may be a processor-driven device that includes components similar to the guide data server 105. For example, an application server 155 may include one or more memory devices on which application data is stored. Additionally, the application server 155 may include one or more network interface devices that are configured to connect the application server 155 to any number of suitable networks, such as the Internet, a cable network, a satellite network, etc. In operation, an application server 155 may receive a request for application data from a programming processing component 110 or a guide data server 105, and the application server 155 may provide information associated with an application in response to a received request. For example, a customer may select a link associated with an entry in an EPG grid, and the selection of the link may be configured to communicate a request for an additional application associated with the entry to an application server 155. In response to the received request, the application server 155 may communicate an additional application to the programming processing component 110.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Figure 3:
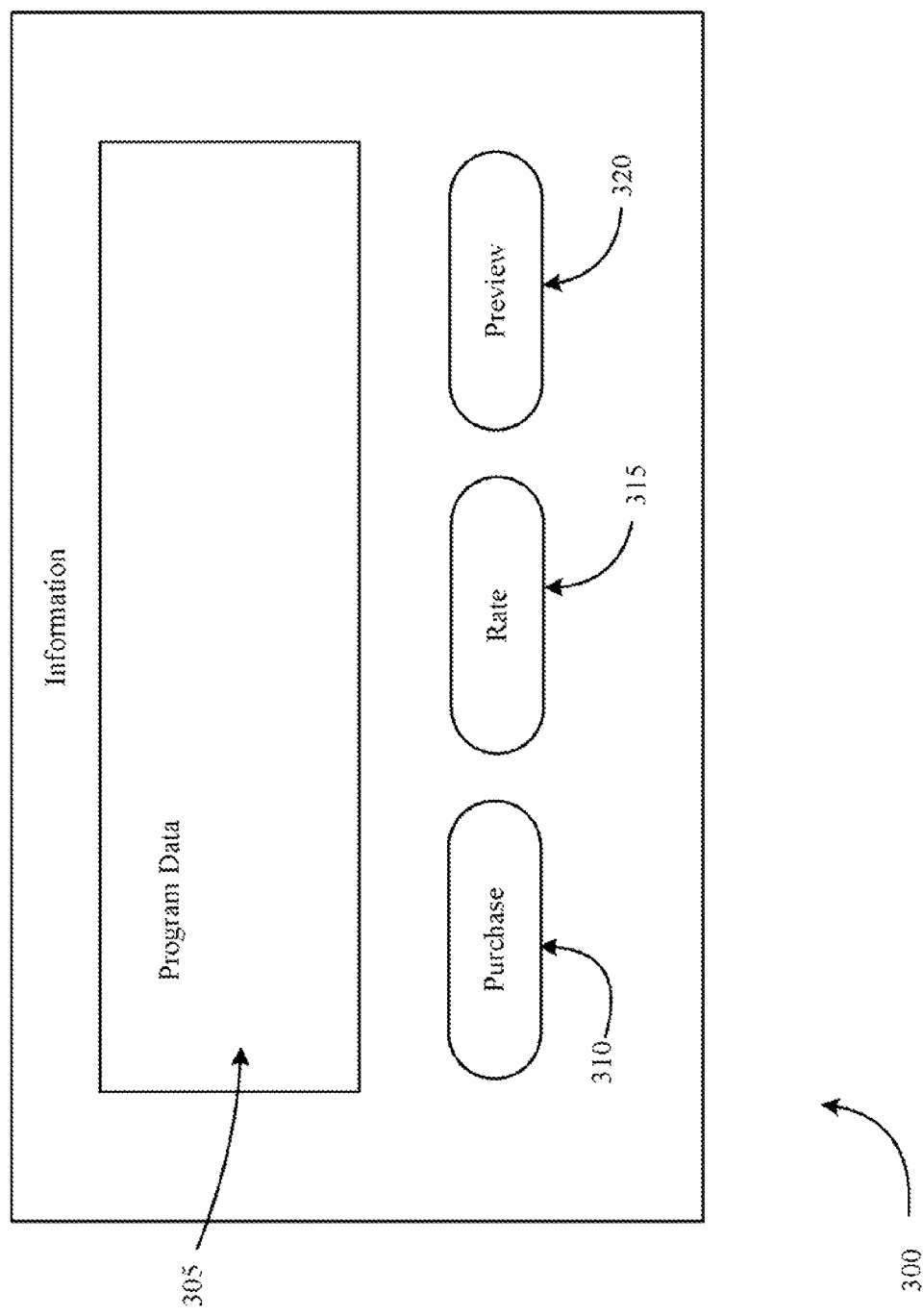
FIG. 3 illustrates one example display that may be presented based upon a selection of a selectable indicator included in an electronic program guide presentation, according to an illustrative embodiment of the invention.
Figure 4:
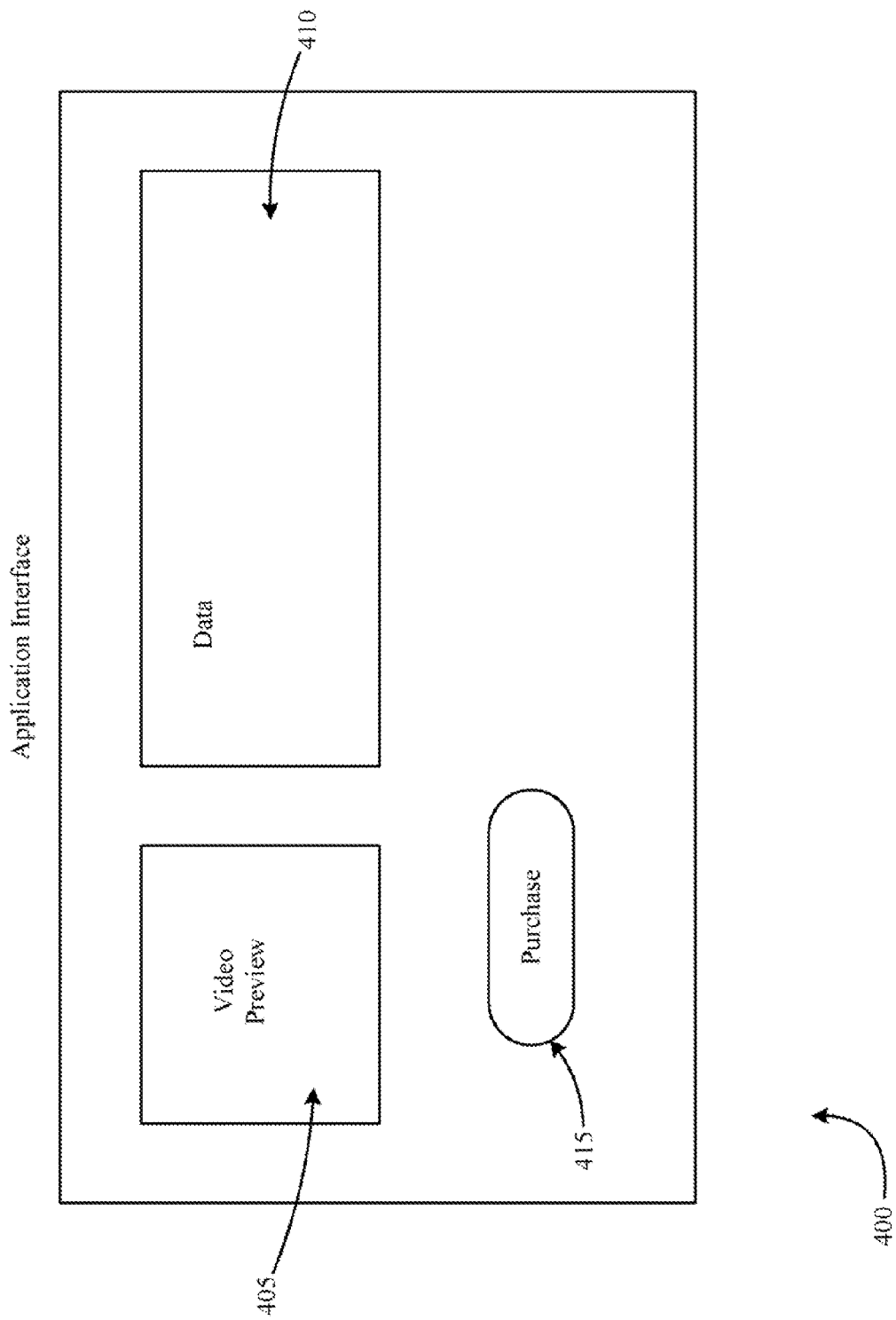
FIG. 4 illustrates one example display associated with an application that may be launched based upon the selection of a selectable indicator included in an electronic program guide presentation, according to an illustrative embodiment of the invention.

A wide variety of presentations and/or displays may be presented to a customer as desired in various embodiments of the invention. For example, presentations associated with an EPG may be presented by a suitable EPG application, such as the EPG application 174 illustrated in FIG. 1. Other presentations may be associated with one or more additional applications that are executed based upon a user selection of an entry in an EPG grid. FIGS. 2-4 illustrates example displays that may be presented to a customer via a suitable display device, such as a television.

FIG. 2 illustrates one example display 200 that may be presented by an electronic program guide application, such as the EPG application 174 illustrated in FIG. 1, in accordance with an example embodiment of the invention. In certain embodiments, the EPG display 200 may include a grid of time slots and channel data (i.e., "on time on channel data"). For example, with reference to FIG. 2, a left-hand column 205 may display available television, movie, and/or PPV channels. Similarly, a top row 210 may display available time slots. Available programming may then be mapped to the available channels and time slots within the grid. As desired, a customer can navigate through the display, which may be scrollable by channel and/or by time slot. For example, a customer may utilize a remote control to navigate through the displayed EPG grid.

Any number of entries included in the EPG grid may be selected by a customer. In certain embodiments, a customer may navigate to a single entry within the EPG grid, such as entry 215 illustrated in FIG. 2. According to an aspect of the invention, the entry 215 may be associated with an additional application that may be executed based upon a customer selection of the entry 215. For example, the additional application may be executed when the customer navigates to the entry 215 and enters an appropriate select command (e.g., the customer selects an "enter" or "select" button utilizing a remote control device). As another example, a customer selection of an individual entry 215 may result in the presentation of one or more additional displays to the customer, such as the display 300 described in greater detail below with reference to FIG. 3. The additional application may then be executed based upon a customer selection within an additional display. As set forth above with reference to FIG. 1, a wide variety of additional applications may be associated with the individual entry 215 as desired in various embodiments of the invention.

Additionally, any number of indicators and/or symbols may be utilized as desired to indicate that an EPG grid entry is associated with an additional application. For example, as illustrated in FIG. 2, an indicator 220 may be provided within the display 200 in association with an individual grid entry 215. The indicator 220 may indicate to a customer that an additional application is associated with the entry 215.

FIG. 3 illustrates one example display 300 that may optionally be presented based upon a selection of a selectable indicator included in an electronic program guide presentation, according to an illustrative embodiment of the invention. The display 300 illustrated in FIG. 3 may be an intermediate display that is presented between the presentation of an EPG grid (e.g., the grid display 200 illustrated in FIG. 2) and the execution of an additional application associated with an individual grid entry, such as the entry 215 illustrated in FIG. 2. For example, the display 300 may be an information display that is presented to a customer when an individual entry 215 associated with a television program, movie, or PPV event is selected by the customer.

With reference to FIG. 3, the display 300 may include one or more sections 305 in which additional information associated with a television program, movie, or PPV event is presented. For example, descriptive information for a television program, such as a synopsis and/or preview information, a list of one or more actors and/or actresses, rating information, and/or date information may be presented to the customer. Additionally, any number of selectable indicators 310, 315, 320 associated with one or more additional applications may be presented. For example, a first selectable indicator 310 that permits a customer to purchase a PPV event may be displayed. Navigation to and/or selection of the first selectable indicator 310 may result in the execution of an additional application that manages and/or facilitates the purchase of the PPV event. As another example, a second selectable indicator 315 that permits a customer to rate a television event and/or submit votes associated with the event may be displayed. Navigation to and/or selection of the second selectable indicator 315 may result in the execution of an additional application that permits the customer to provide rating and/or voting information to a service provider head end and/or an information collection server, such as a server associated with a network provider or broadcaster that aired the television event. As yet another example, a third selectable indicator 320 that permits a customer to preview a television, movie, or PPV event may be displayed. Navigation to and/or selection of the third selectable indicator 320 may result in the execution of an additional application that provides additional preview information associated with the event, such as a trailer for a movie. The selectable indicators and associated applications that are described with reference to FIG. 3 are provided by way of example only. Any number of other selectable indicators and/or associated applications may be utilized as desired in various embodiments of the invention.

When an additional application associated with an EPG grid entry is executed, any number of displays and/or presentations that are associated with the additional application may be presented to the customer via a suitable display device. For example, a programming processing component, such as the programming processing component 110 illustrated in FIG. 1, may obtain information associated with the additional application and execute the additional application. During the execution of the additional application, the programming processing component 110 may format any number of static and/or interactive displays for presentation to the customer, and the programming processing component 110 may output one or more of the formatted displays for presentation by a suitable display device.

FIG. 4 illustrates one example display 400 associated with an application that may be launched based upon the selection of a selectable indicator included in an electronic program guide presentation, according to an illustrative embodiment of the invention. The display 400 illustrated in FIG. 4 is an example display that may be associated with an additional application that facilitates and/or manages the purchase of a PPV event. With reference to FIG. 4, the display 400 may include any amount of information associated with a PPV event, such as a video section 405 that provides a video preview of the PPV event and/or a text or data section 410 that provides textual and/or graphical information about the PPV event. Additionally, the display 400 may include any number of selectable indicators that facilitate the receipt of user commands, such as a selectable indicator 415 that facilitates a purchase of the PPV event, an indicator that accesses a Web site that provides additional information associated with the PPV event, and/or a selectable indicator that allows a customer to exit the additional application.

Operational Overview

Figure 5:
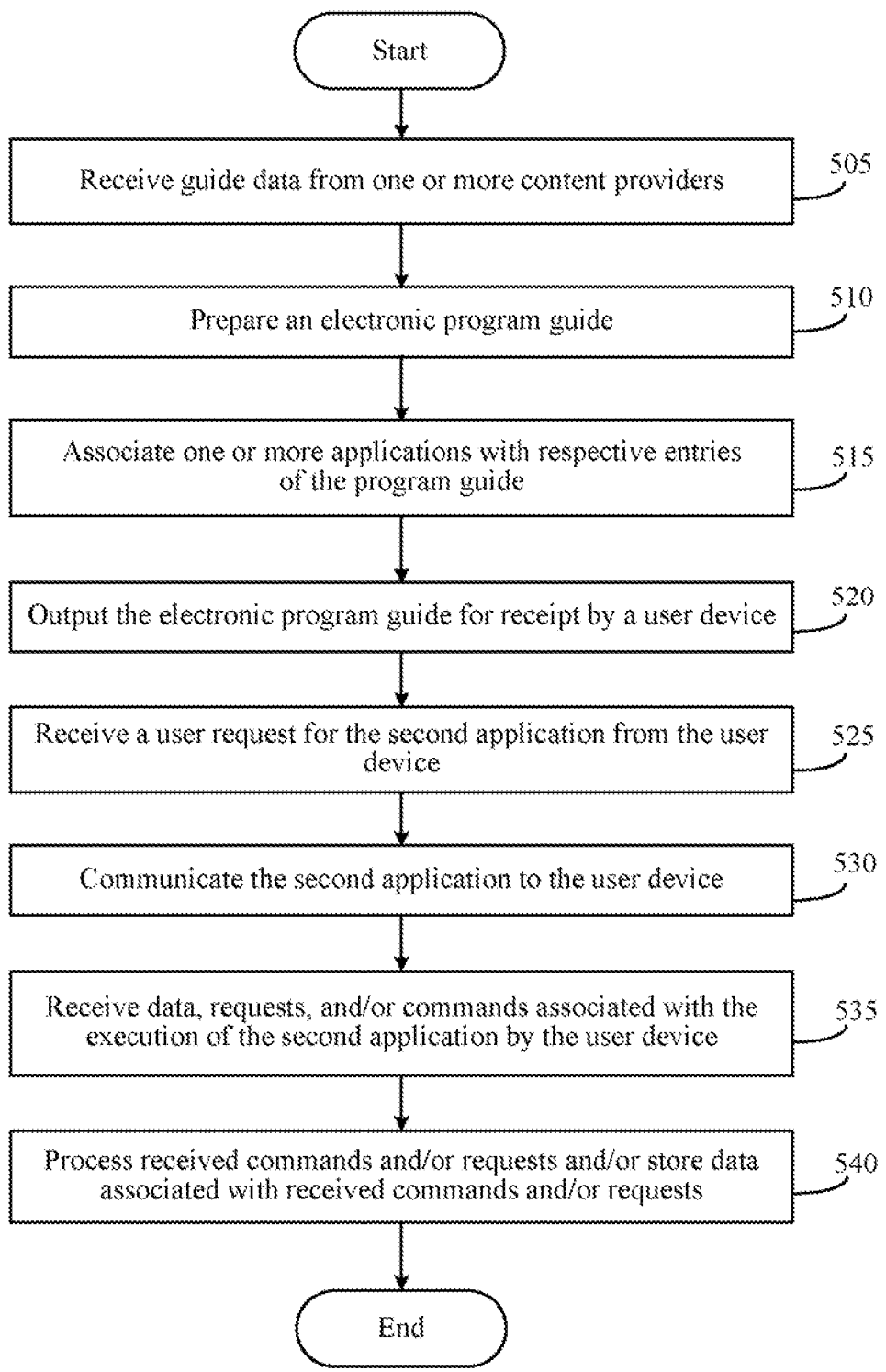
FIG. 5 is a flow diagram of an example method for associating one or more applications with an electronic program guide, according to an example embodiment of the invention.

FIG. 5 is a flow diagram of an example method 500 for associating one or more applications with an electronic program guide, according to an example embodiment of the invention. The method 500 may be performed by a suitable guide data server, such as the guide data server 105 illustrated in FIG. 1. The method 500 may begin at block 505.

At block 505, guide data may be obtained from one or more content providers, such as the content providers 125 illustrated in FIG. 1. The guide data may include data associated with programming options that are offered by any number of broadcast entities and/or service providers (e.g., cable service providers, satellite providers, etc.). In addition to or as an alternative to obtaining guide data from content providers, guide data may be accessed from any number of suitable memory devices and/or databases.

At block 510, an electronic program guide ("EPG") may be prepared and/or generated utilizing at least a portion of the obtained guide data. The prepared EPG may include a data file and/or data stream that may be accessed by an EPG application associated with a customer programming processing component, such as the EPG application 174 associated with the customer processing component 110 illustrated in FIG. 1. For example, an EPG application 174 may access a received EPG data file and/or data stream, and the EPG application 174 may utilize at least a portion of the information included in the data file to prepare an EPG grid that may be presented to a customer. The EPG data file and/or data stream may include programming information that is organized by time slot and by available channel. A wide variety of programming information may be included in an EPG data file and/or data stream as desired in various embodiments of the invention, such as information associated with television programs, movies, PPV events, and/or other programming options.

At block 515, one or more additional applications may be associated with any number of entries included in the EPG data. In this regard, one or more additional applications may be associated with various entries in an EPG grid that is presented to a customer. A wide variety of suitable techniques may be utilized as desired to associate an application with an entry in the EPG data. For example, executable instructions and/or an executable file for an application may be incorporated into an entry. As another example, a pointer to a memory location at which the application may be accessed may be incorporated into an entry. In this regard, the EPG application 174 may access the application from local memory associated with the programming processing component 110, from a carousel data stream or data file, and/or from an external data server, such as the guide data server 105. As yet another example, a link (e.g., a hyperlink, URL, etc.) to a server at which an additional application is stored may be incorporated into an entry of the EPG data. Additionally, as desired, information associated with indicators that will be presented to the customer in associated with an EPG grid may be incorporated into an entry of the EPG data. The presented indicators may indicate that an additional application is associated with a grid entry.

As described in greater detail above with reference to FIG. 1, a wide variety of different types of additional applications may be associated with EPG data. Additionally, a wide variety of different programming techniques may be associated with additional applications. For example, EBIF applications, Java applications, and/or applications that utilize any number of other programming languages and/or protocols may be associated with EPG data.

At block 520, the generated EPG data that includes one or more associated additional applications may be output for receipt by one or more user or customer devices, such as one or more programming processing components 110. In certain embodiments, the EPG data may be incorporated into a broadband signal (e.g., a cable signal, a satellite signal, etc.) that is communicated to any number of customers, households, and/or businesses. In certain embodiments, the guide data server 105 may incorporate the EPG data into a broadband signal. In other embodiments, the guide data server 105 may provide the EPG data to another component of a service provider, such as a cable head end server, and the other component may incorporate the EPG data into a broadband signal.

Once the EPG data is received, the EPG application 174 may utilize at least a portion of the EPG data to prepare an EPG grid that is presented to a customer via a television or other suitable display device. A customer may navigate through the EPG grid and select any number of individual entries or cells within the EPG grid. Based upon a customer or user selection of a grid entry that is associated with an additional application, the additional application may be executed by the programming processing component 110 associated with the customer. In certain embodiments, the programming processing component 110 may utilize a link or pointer associated with the additional application in order to request information associated with the additional application from an external data server, such as the guide data server 105.

At block 525, which may be optional in certain embodiments of the invention, a request for a second application or additional application may be received from a programming processing component 110 or other customer or user device. For example, a request that is communicated based upon a pointer or link associated with an additional application may be received. At block 530, the additional application or second application may be communicated or output for receipt by the customer device (e.g., the programming processing component 110) based upon the receipt and processing of the request.

Certain additional applications that are executed by a programming processing component 110 may be configured to collect a wide variety of user requests, commands, preferences, and/or other information. For example, a PPV application may be configured to collect a purchase command for a PPV event. As another example, a rating application may be configured to collect customer rating data associated with a television program. Once requests and/or information are collected, the additional application may be configured to direct the programming processing component 110 to communicate at least a portion of the collected requests, commands, and/or other information to an external server, such as the guide data server 105.

At block 535, which may be optional in certain embodiments of the invention, various data, requests, and/or commands associated with the execution of an additional application or second application may be received. The received commands, requests, and/or data may then be processed at block 540. As desired, during the processing of a request or command, a wide variety of information, functionality, and/or programming options (e.g., a PPV event) may be provided to a programming processing component 110 from which the information was received. Additionally, as desired, collected or received requests, commands, and/or data may be stored for subsequent access and/or processing.

The method 500 may end following block 540.

Figure 6:
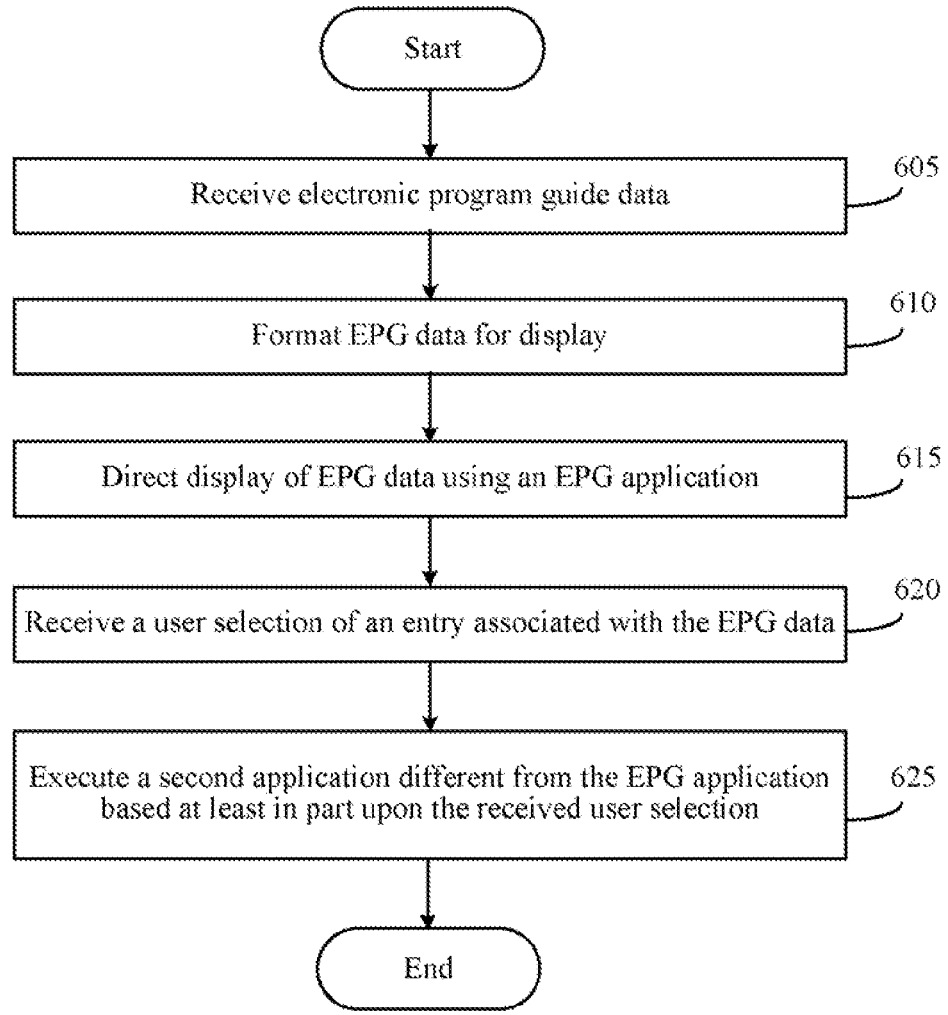
FIG. 6 is a flow diagram of an example method for executing an additional application that is associated with an electronic program guide, according to an example embodiment of the invention.

FIG. 6 is a flow diagram of an example method 600 for executing an additional application that is associated with an electronic program guide, according to an example embodiment of the invention. The method 600 may be performed by a suitable programming processing component associated with a customer of a service provider (e.g., a cable service provider, satellite service provider, etc.), such as the programming processing component 110 illustrated in FIG. 1. The method 600 may begin at block 605.

At block 605, EPG data may be received. In certain embodiments, an EPG data file and/or an EPG data stream that is incorporated into a broadcast signal (e.g., a cable signal, a satellite signal, etc.) may be received and/or identified. At block 610, at least a portion of the EPG data may be utilized to format and/or construct an EPG display, such as an EPG grid. For example, received EPG data may be parsed into on time on channel data, and the parsed data may be utilized to populate an EPG grid. The display of EPG data may then be output for display or presentation to a customer at block 615. For example, an EPG application associated with the programming processing component 110, such as the EPG application 174 illustrated in FIG. 1, may format an EPG grid for display and direct a suitable display device, such as a television, to display the EPG grid to a customer. In certain embodiments, if an additional application is associated with an EPG grid entry, an indicator or icon that is indicative of the association may be incorporated into the data to be displayed.

According to an aspect of the invention, the EPG grid may be an interactive grid, and a customer may utilize a suitable input device (e.g., a remote control) to navigate through the grid and select any number of entries within the grid, such as an entry associated with a particular television show, movie, PPV event, and/or other event. At block 620, a customer selection of an entry included in a displayed EPG grid may be received. According to an aspect of the invention, the selected entry may be an entry that is associated with an additional application.

At block 625, a second application or additional application that is associated with the EPG grid entry may be executed by the programming processing component 110. In certain embodiments, the additional application may be executed once the EPG grid entry is selected. In other embodiments, one or more intermediate displays may be presented to the customer when an EPG grid entry is selected, and the additional application may be executed based upon the selection of a selectable indicator or option that is included in an intermediate display. Additionally, in certain embodiments, the additional application may be executed in parallel with the EPG application 174 that formats the EPG grid. In other embodiments, execution of the EPG application 174 may be suspended when the additional application is executed.

A wide variety of techniques may be utilized as desired by the programming processing component 110 to execute an additional application. For example, the additional application may be accessed from the EPG data and executed. As another example, a pointer or link included in the EPG data may be utilized to assess the additional application from any number of locations, such as local memory associated with the programming processing component 110 (e.g., the additional application has previously been communicated to and stored by the programming processing component 110), a carousel file, and/or one or more external servers (e.g., the guide data server 105 illustrated in FIG. 1, an application server 155 illustrated in FIG. 1, or another server).

Additionally, as described in greater detail above with reference to FIG. 1, a wide variety of different types of additional applications may be executed by the programming processing component 110 as desired in various embodiments of the invention. Certain applications may collect a wide variety of different customer commands, requests, preferences, and/or information (e.g., purchase requests, rating information, voting information, requests to record a program, etc.). In certain embodiments, collected information may be processed by an additional application. In other embodiments, at least a portion of collected information may be communicated by the programming processing component 110 to one or more external servers, such as a guide data server 105 or other server.

The method 600 may end following block 625.

The operations described and shown in the methods 500, 600 of FIGS. 5 and 6 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 5 and 6 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   generating, by a data server, an electronic program guide comprising television schedule information organized in a grid by time and channel, wherein the electronic program guide is presented to a user by an electronic program guide application executed by a programming processing component associated with the user;
   associating, by the data server with an entry in the grid of the electronic program guide, a second application different from the electronic program guide application, wherein the association comprises embedding entirely the second application comprising executable instructions in a data file that includes the electronic program guide presented to the user, wherein the executable instructions are executable by the programming processing component to execute the second application based at least in part upon the user selecting the entry; and
   directing, by the data server, the data file for receipt by the programming processing component.

2. The method of claim 1, wherein associating a second application further comprises including a link to the second application in the data file that includes the electronic program guide.

3. The method of claim 2, wherein the second application is accessed by the programming processing component from one of (i) a memory associated with the data server, (ii) a local memory associated with the programming processing component, or (iii) a carousel data stream that is accessible by the programming processing component.

4. The method of claim 1, further comprising:
   receiving, by the data server from the programming processing component, a request for the second application; and
   directing, by the data server to the programming processing component, the communication of information associated with the second application.

5. The method of claim 1, further comprising:
   receiving, by the data server from the programming processing component based upon an execution of the second application by the programming processing component, information associated with the second application; and
   processing, by the data server, the received information.

6. The method of claim 1, wherein the second application is executed by the programming processing component in parallel with the electronic program guide application.

7. The method of claim 1, wherein the execution of the electronic program guide application is suspended once the second application is executed.

8. The method of claim 1, wherein the second application comprises one of (i) an Enhanced TV Binary Interchange Format (EBIF) application, (ii) a Java application, (iii) an AppleScript application, (iv) a Virtual Basic for Applications (VBA) application, (v) a Common List Object System (CLOS) application, (vi) an Eiffel application, (vii) a Sather application, (viii) a Perl application, or (ix) an Obliq application.

9. The method of claim 1, wherein the second application comprises one of (i) an application that facilitates the purchase of an on demand or pay-per-view program, (ii) an application that facilitates the scheduling of a program by a recording device, (iii) an application that facilitates the purchase of goods or services, or (iv) an application that facilitates the rating of a program.

10. A data server, comprising:
at least one communications interface configured to communicate an electronic program guide to a programming processing component associated with a user, wherein the electronic program guide is presented to the user by an electronic program guide application executed by the programming processing component; and
at least one processor configured to (i) generate the electronic program guide, the guide comprising television schedule information organized in a grid by time and channel, (ii) associate, with an entry in the grid, a second application different from the electronic program guide application, wherein the association comprises embedding entirely the second application comprising executable instructions in a data file that includes the electronic program guide presented to the user, wherein the executable instructions are executable by the programming processing component to execute the second application based at least in part upon the user selecting the entry, and (iii) direct the at least one communications interface to communicate the data file to the programming processing component.

11. The data server of claim 10, wherein:
the at least one communications interface is further configured to receive content from one or more content providers, and
the at least one processor is further configured to generate the electronic program guide based at least in part on the received content, wherein the generation comprises embedding the electronic program guide and the content in the data file.

12. The data server of claim 10, wherein the association of the second application with the entry further comprises including a link to the second application in the data file that includes the electronic program guide.

13. The data server of claim 12, wherein the second application is accessed by the programming processing component from one of (i) a memory associated with the data server, (ii) a local memory associated with the programming processing component, or (iii) a carousel data stream that is accessible by the programming processing component.

14. The data server of claim 10, wherein:
the at least one communications interface is further configured to receive, from the programming processing component based upon an execution of the second application by the programming processing component, information associated with the second application, and the at least one processor is further configured to process the received information.

15. The data server of claim 10, wherein the second application is executed by the programming processing component in parallel with the electronic program guide application.

16. The data server of claim 10, wherein the execution of the electronic program guide application is suspended once the second application is executed.

17. The data server of claim 10, wherein the second application comprises one of (i) an Enhanced TV Binary Interchange Format (EBIF) application, (ii) a Java application, (iii) an AppleScript application, (iv) a Virtual Basic for Applications (VBA) application, (v) a Common List Object System (CLOS) application, (vi) an Eiffel application, (vii) a Sather application, (viii) a Perl application, or (ix) an Obliq application.

18. The data server of claim 10, wherein the second application comprises one of (i) an application that facilitates the purchase of an on demand or pay-per-view program, (ii) an application that facilitates the scheduling of a program by a recording device, (iii) an application that facilitates the purchase of goods or services, or (iv) an application that facilitates the rating of a program.

19. A programming processing component comprising:
at least one communications interface configured to receive a data file comprising (i) electronic program guide data, the electronic program guide data comprising television schedule information that is organized in a grid by time and channel for presentation to a user, and (ii) an entire second application comprising executable instructions different from an electronic program guide application associated with the programming processing component, wherein the executable instructions are executable by the programming processing component to execute the second application;
at least one user interface configured to receive user input associated with a displayed grid associated with the electronic program guide data; and
at least one processor configured to execute the electronic program guide application which (i) formats the grid for display to the user, wherein an entry of the grid is associated with the second application, (ii) outputs the grid for display to the user, and (iii) receives a user selection of the entry of the grid,
wherein the at least one processor is further configured to execute the second application based upon the received user selection.

20. The method of claim 1, further comprising:
receiving, by the data server, content from one or more content providers, wherein the generation of the electronic program guide further comprises embedding, by the data server, the electronic program guide and the content in the data file.

21. The method of claim 20, wherein the content comprises information associated with one or more scheduled television shows, one or more recorded movies, and one or more pay-per-view features, wherein the information is presented to the user by the programming processing component upon the user selecting the entry in the grid.

* * * * *